United States Patent [19]

Guarro

[11] Patent Number: 4,771,515
[45] Date of Patent: Sep. 20, 1988

[54] HOLDING DEVICE

[76] Inventor: Elisha Guarro, 420 N. Delsea Dr., Clayton, N.J. 08312

[21] Appl. No.: 923,805

[22] Filed: Oct. 27, 1986

[51] Int. Cl.$^4$ ........................................... A44B 21/00
[52] U.S. Cl. ..................................... 24/3 C; 24/3 H; 24/3 F; 24/3 G; 24/3 J; 24/11 M; 24/338; 24/502; 24/535; 206/5
[58] Field of Search ............... 24/3 C, 3 G, 3 R, 3 H, 24/3 E, 3 J, 3 F, 3 L, 5, 10 R, 11 R, 11 HC, 11 S, 11 M, 11 P, 338, 339, 457, 502, 535, 541, 134 L; 206/5

[56] References Cited

U.S. PATENT DOCUMENTS

| | | | |
|---|---|---|---|
| 652,245 | 6/1900 | Cameron | 24/3 F |
| 794,065 | 7/1905 | Woodworth | 24/10 R |
| 1,474,308 | 11/1923 | Wimberly | 24/3 H |
| 1,486,472 | 3/1924 | Windecker | 24/3 H |
| 1,568,889 | 1/1926 | Eliasson | 24/11 M |
| 1,748,430 | 2/1930 | Stringham | 24/3 G |
| 1,834,151 | 12/1931 | Gordon | 24/11 M |
| 2,512,031 | 6/1950 | Marcoux | 24/11 M |
| 2,551,913 | 5/1951 | Toby | 24/3 F X |
| 3,052,002 | 9/1962 | Lesher | 24/3 J |
| 4,452,354 | 6/1984 | Tabacknick | 206/5 |

FOREIGN PATENT DOCUMENTS 180899 12/1917 Canada .............................. 24/11 R Primary Examiner—Kenneth J. Dorner
Assistant Examiner—Laurie K. Cranmer
Attorney, Agent, or Firm—Charles F. Duffield

[57] ABSTRACT

A holder for supporting and securing such items as eyeglasses within a shirt or coat pocket is disclosed. The holder utilizes a hollow holder housing having opposed front and rear walls and relatively narrow side walls. A pivot arm is pivotally secured within the housing and has included therein a movable grip projecting through the front wall which engages a stationary grip secured to the external surface of the front wall. A spring member interconnected between the housing and the pivot arm urges the movable grip into closed position with the stationary grip which grips, in closed position, secure, for example, the temple piece of eyeglasses. A spring clip positioned on the rear wall of the holder housing secures the housing and such items as eyeglasses secured therein within the shirt or coat pocket of the user. A tang extending from the pivot arm above the front wall of the holder housing permits movement of the movable grip between opened and closed positions for insertion and removal of such items as the temple piece of eyeglasses from the holder and pocket.

6 Claims, 2 Drawing Sheets

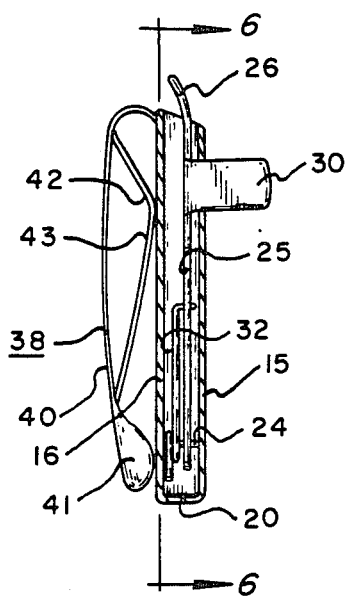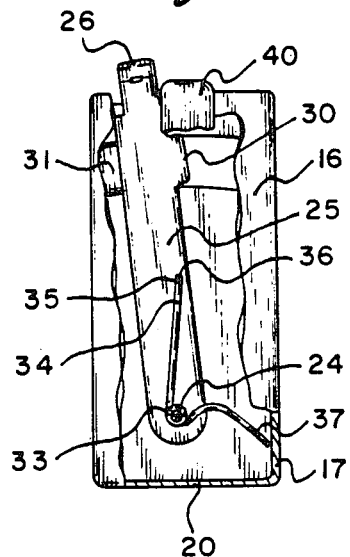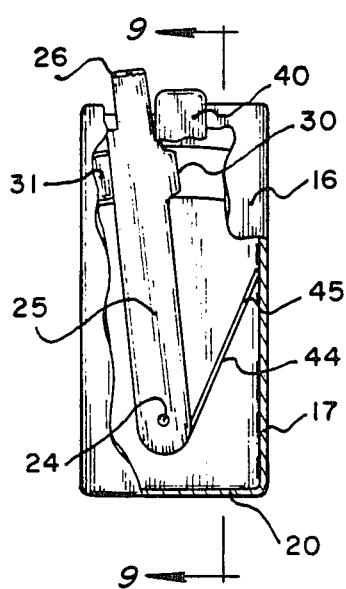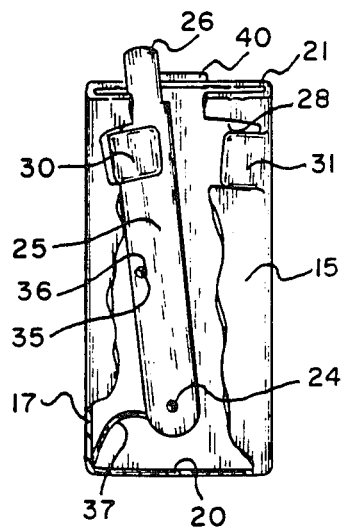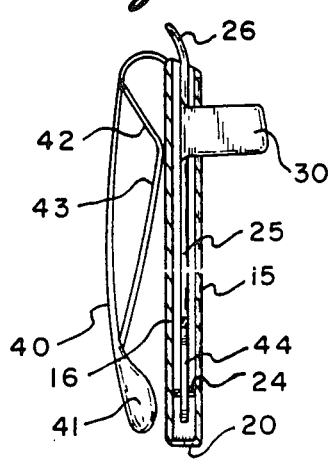

HOLDING DEVICE

BACKGROUND OF INVENTION

The present invention relates to holding devices for securing such items as eyeglasses upon the person of the user and, more particularly, to securing eyeglasses within a shirt or coat pocket.

As respects eyeglasses, the many millions of Americans who wear eyeglasses quite commonly carry them in their shirt pocket or coat pocket. A common and aggravating occurrence is that, when the individual bends over, the eyeglasses will fall from his shirt or coat pocket often causing damage to the glasses.

Various means have been tried for securing the eyeglasses to the pocket of the user such as a clasp secured to one of the temple pieces. These clasps often break off and are otherwise difficult to insert upon the upper edge of the pocket.

Another means of securing the eyeglasses within a pocket heretofore tried has been the utilization of a glasses case and means for securing the glasses case to the pocket. This arrangement is bulky and, again, insertion and removal of the eyeglasses from the case itself is often difficult.

There exists a need for a device or means which, itself, can be secured to the pocket on a more or less permanent basis and which is capable of securing glasses within the pocket by easy insertion and removal therefrom.

SUMMARY OF INVENTION

The holder of the present invention permits the securement of such items as eyeglasses by their temple piece within a shirt or coat pocket and permits easy insertion and removal of the glasses from the holder and the pocket.

The holder includes a hollow holder housing having opposed front and rear walls and relatively narrow side walls formed integrally with the front and rear walls.

A pivot pin is positioned between the front and rear walls and supports, for pivotal movement therebetween, a pivot arm. The pivot arm includes a movable grip extending therefrom through an arcuate slot in the front wall of the holder. A tang extends upwardly from the upper portion of the pivot arm beyond the upper edge of the front wall and the arm is movable in an arcuate or pivotable manner by the tang.

The front wall further includes a stationary grip extending outwardly from the front wall and of approximate configuration with the movable grip.

A spring member interacts between the pivot arm and the hollow holder housing to urge the pivot arm and its included movable grip into closed contact with the stationary grip.

A spring clip is secured to the rear wall of the hollow holder housing. The spring clip secures the holder housing to the shirt pocket and may be positioned either inside the shirt pocket or outside thereof.

Once the holder housing is in place within the pocket, devices such as eyeglasses may be secured to the pocket by means of the holder housing by moving the pivot arm by means of the tang to a position wherein the movable grip is out of engagement with the stationary grip. In this position, the temple piece of the eyeglasses may be placed between the movable and stationary grips and thereafter, upon release of the tang, the spring will urge the movable grip into engagement with the stationary grip thereby securing the eyeglasses within the pocket by its temple piece.

DESCRIPTION OF DRAWINGS

FIG. 5 is a left side elevational view partially in section of the holder of the present invention;

FIG. 6 is a rear elevational view partially in section of the holder of the present invention;

FIG. 7 is a front elevational view partially in section of the holder of the present invention in open position;

FIG. 8 is a front elevational view partially in section of the holder of the present invention showing an alternate spring arrangement; and FIG. 9 is a right side elevational view partially in section of the spring arrangement of FIG. 8.

DETAILED DESCRIPTION OF INVENTION

Figure 1:
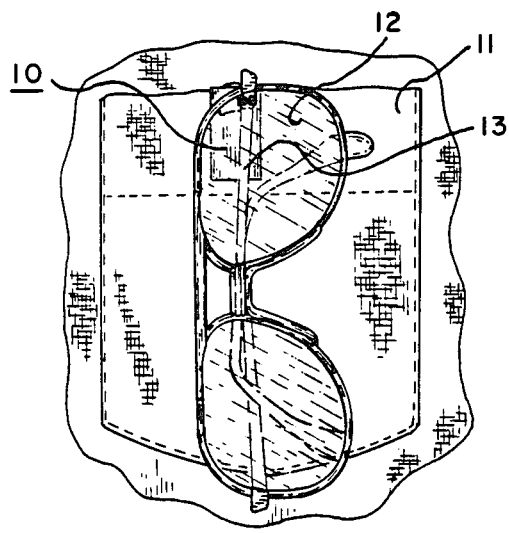
FIG. 1 is a front elevational view of the holder of the present invention in position on the outside of the user's pocket and securing a pair of eyeglasses.
Figure 2:
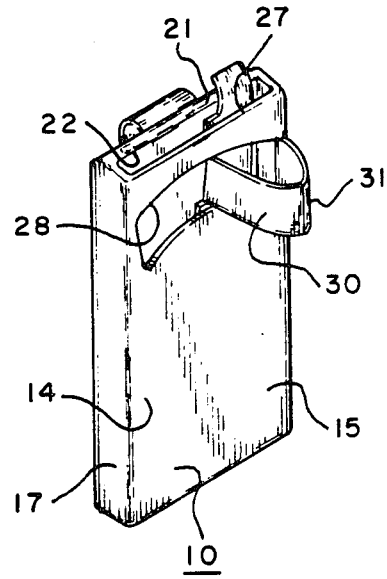
FIG. 2 is a perspective view of the holder of the present invention showing the front and left side thereof.

The holder of the present invention is shown in FIG. 1 of the drawings in one of its modes of use, i.e. to secure eyeglasses. The description of the invention following will be in relation to that mode of use. The eyeglasses holder 10 may be secured to the upper edge of a coat or shirt pocket 11 either on the inside thereof or, as shown in FIG. 1, on the outside thereof. A pair of eyeglasses 12 are secured by one of their temple pieces 13 to the eyeglasses holder 10 to secure the glasses within or without the pocket as to be hereinafter described.

The specific structure of one embodiment of the eyeglasses holder of the present invention is shown in FIGS. 2–7. The description of the first embodiment of the eyeglasses holder of the present invention will be made generally in reference to all of FIGS. 2–7 unless reference to a specific figure is required.

The eyeglasses holder 10 utilizes a hollow holder housing 14. The hollow holder housing 14 includes a front wall 15, a rear wall 16 and a relatively narrow integrally formed left side wall 17 and a right side wall 18.

The hollow holder housing 14 also includes a closed bottom wall 20. A top wall 21 is formed integrally in the upper portion of the hollow holder housing 14. A tang slot 22 is formed in the top wall 21 and extends substantially across the entire width of the top wall 21.

A pivot pin 24, as best seen in FIG. 5, is positioned in the lower portion of the holder housing 14 and extends to and is anchored into both the front and rear walls 15 and 16 respectively of the hollow holder housing 14. Pivotally mounted upon the pivot pin 24 is a pivot arm 25.

The pivot arm 25 is secured upon the pivot pin 24 at its lowermost extremity. The upper portion of the pivot arm 24 includes a pivot arm tang 26 which extends through the tang slot 22 and above the upper edge 27 of the front wall 15.

The front wall 15 of the hollow holder housing 14 includes, in the upper portion thereof, an arcuate cutout 28 which extends across the face of the front wall 15. The pivot arm 25 includes, formed integrally thereon and extending through the arcuate cutout 28, a movable grip 30. The configuration of the arcuate cutout 28 in respect to the position of the pivot pin 24 is such that the movable grip 30 will move within the arcuate cutout as the pivot arm 25 is pivoted by means of the pivot arm tang 26 from its most extreme left position to its most extreme right position.

The front wall 15 of the hollow holder housing 14 includes, formed integrally therein, a stationary grip 31 at the extreme right side of the arcuate cutout 28. The configuration of the movable grip 30 and stationary grip 31 are substantially identical but reversed from one another and are of a configuration to grasp and securely hold a temple piece of a pair of eyeglasses when positioned between the movable and stationary grips 30 and 31 respectively when in closed position as more particularly shown in FIG. 2.

As best shown in FIGS. 5 and 6, a return spring 32 is interconnected between the hollow holder housing 14 and the pivot arm 25. The return spring 32 includes a single turn coil 33 which is anchored or positioned upon the pivot pin 24. The upper arm 34 of the return spring 32 includes an anchor 35 formed 90° to the upper arm 34. The anchor 35 is positioned within an aperture 36 within the pivot arm 25 to secure the upper arm 34 to the midportion of the pivot arm 25.

The return spring 32 includes a lower arm 37 which is anchored into the left side wall 17. The tension in the return spring 32 is such that the return spring will urge the pivot arm 25 toward the right side wall 18 and thus maintain the movable grip 30 into engagement with the stationary grip 31.

Figure 3:
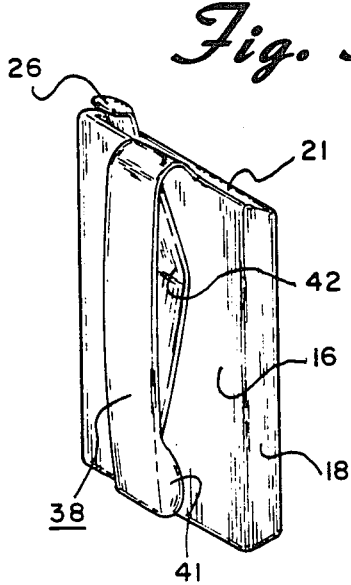
FIG. 3 is a perspective view of the holder of the present invention showing the rear and right side thereof.
Figure 4:
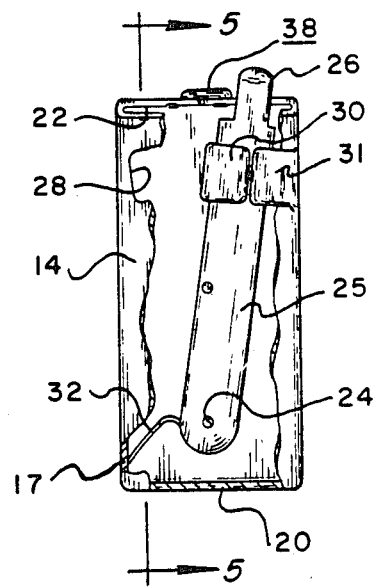
FIG. 4 is a front elevational view partially in section of the holder of the present invention.

As best seen in FIGS. 3 and 5, the eyeglasses holder 10 includes a spring clip 38. The spring clip 38 extends from, and is formed integral with, the rear wall 16 and extends from the top wall 21 of the hollow holder housing 14 toward the bottom wall 20. The spring clip 38 includes a spring arm 40 extending from the top wall 21 and terminating in a ball clasp 41. Formed into the spring arm 40 is a clasp arm 42, the upper portion 43 of which bears against the outside of the rear wall 16. This arrangement of the spring clip 38 provides for a positive grip upon a shirt or coat pocket of the user by engagement of the ball clasp 41 and upper portion 43 of the clasp arm 42 with the fabric of the pocket.

An alternative return spring arrangement is shown in FIGS. 8 and 9 of the drawings. In this embodiment, a modified return spring 44 is either formed integrally with the pivot arm 25 or anchored therein by such means as welding in a manner and fashion such that the return spring is in the same plane as the broad surface of the pivot arm 25. In the embodiment of FIGS. 8 and 9, the upper portion 45 of the return spring 44 is positioned into engagement with the left side wall 17 of the hollow holder housing 14. The spring tension of the return spring 44 is such as to urge the pivot arm 25 in a direction to bring the movable grip 30 into engagement with the stationary grip 31.

An advantage of the embodiment of FIGS. 8 and 9 is that the width of the side walls 17 and 18 may be reduced to reduce the overall thickness of the eyeglasses holder.

In use of either embodiment of the eyeglasses holder of the present invention, the eyeglasses holder is positioned upon the upper edge of the pocket of the user by sliding the holder into place upon the upper edge of the pocket with the upper edge of the pocket being positioned between the ball clasp 41 and upper portion 43 of the clasp arm 42. The eyeglasses holder may be positioned with the hollow holder housing 14 disposed within the pocket or the reverse, the former being preferred. In use, the movable grip 30 is moved to an open position in respect to the stationary grip 31 by movement of the pivot arm tang 26 to the left. Thereafter, the temple piece may be positioned between the movable grip 30 and stationary grip 31 and the pivot arm tang released bringing the movable grip 30 into engagement with the stationary grip 31 and thereby securing the temple piece and glasses in place either in the inside of the pocket or, if desired, upon the outside of the pocket of the user.

The holder of the present invention may be formed of many different materials. It is anticipated that either a metal may be used which may be appropriately chrome plated or a resilient plastic may be used for economic reasons.

The holder of the present invention has been described in reference to its use to secure eyeglasses within the coat or shirt pocket of the user. The holder may also be used to secure many other devices such as pencils, pens and medical or scientific instruments.

The holder of the present invention has been described in respect to particular embodiments thereof as shown in the drawings. However, the present invention may be embodied in other specific forms without departing from the spirit or essential attributes thereof and, accordingly, reference should be made to the appended claims, rather than to the foregoing specification and drawings as indicating the scope of the invention.

What is claimed is:

1. A holder for supporting and securing such devices as eyeglasses by a temple piece within a shirt or coat pocket comprising:
    a uniplanar support member;
    a stationary grip secured to and extending perpendicularly from the support member and adapted to receive the temple piece of the eyeglasses;
    a movable grip adapted to receive the temple piece of the eyeglasses and movably secured to the support member in a manner to move in a plane parallel to the support member between an open position out of engagement with the stationary grip and a closed position in engagement with the stationary grip;
    biasing means urging the movable grip into closed position with the stationary grip; and
    support securing means for securing the support member to the pocket whereby the holder may be secured to a pocket and the eyeglasses secured within the pocket by the eyeglasses holder by insertion of the temple piece between the movable and stationary grips when in an opened position and thereafter released to the closed position.

2. The holder of claim 1 wherein the uniplanar support member forms a part of a hollow holder housing having opposed front and rear walls and relatively narrow side walls formed integrally with the front and rear walls.

3. The holder of claim 2 wherein the stationary grip projects outwardly from the front wall of the holder housing; and wherein the movable grip includes a pivot arm having an upper and lower portion and pivotally connected at its lower portion between the front and rear walls and includes the movable grip projecting therefrom outwardly through the front wall.

4. The holder of claim 3 wherein the biasing means is a spring member interconnected between the hollow holder housing and the pivot arm.

5. The holder of either of claim 3 wherein the pivot arm includes, on the upper portion thereof, a tang projecting above the front wall thereof to permit movement of the pivot arm and included movable grip between opened and closed positions.

6. The holder of claim 5 wherein the support securing means is a resilient clip secured to the rear wall of the hollow holder housing.

* * * * *